United States Patent
Naqvi et al.

Patent Number: 5,847,714
Date of Patent: Dec. 8, 1998

[54] INTERPOLATION METHOD AND APPARATUS FOR FAST IMAGE MAGNIFICATION

[75] Inventors: H. Shahzad Naqvi; Russell J. Huonder, both of Fort Collins, Colo.

[73] Assignee: Hewlett Packard Company, Palo Alto, Calif.

[21] Appl. No.: 656,500

[22] Filed: May 31, 1996

[51] Int. Cl.$^6$ ........................................... G06T 3/40
[52] U.S. Cl. .................... 345/439; 348/561; 382/298
[58] Field of Search ...................... 345/428, 433, 345/439, 127, 132, 138, 150, 154; 348/426, 441, 458, 552, 561, 563, 504; 382/162, 166, 298, 299; 358/451

[56] References Cited

U.S. PATENT DOCUMENTS

| | | | |
|---|---|---|---|
| 4,988,984 | 1/1991 | Gonzalez-Lopez | 345/132 |
| 5,113,455 | 5/1992 | Scott | 382/298 |
| 5,125,042 | 6/1992 | Kerr et al. | 382/300 |
| 5,335,296 | 8/1994 | Larkin et al. | 382/298 |
| 5,384,904 | 1/1995 | Spague et al. | 345/439 |
| 5,475,803 | 12/1995 | Stearns et al. | 345/436 |
| 5,574,572 | 11/1996 | Malinowski et al. | 358/451 |
| 5,579,418 | 11/1996 | Williams et al. | 382/300 |

FOREIGN PATENT DOCUMENTS

| | | |
|---|---|---|
| 2 172 167 | 3/1985 | United Kingdom . |
| 2 287 154 | 2/1995 | United Kingdom . |
| 2 303 758 | 7/1996 | United Kingdom . |

*Primary Examiner*—Stephen S. Hong

[57] ABSTRACT

Methods and apparatus for generating pixel values in a magnified destination image of an object are provided. The pixel values in the destination image are generated from a source image of the object. A value of a first pixel in each row of the destination image is determined by transforming the first pixel to a first resampled point in the source image and by vertical interpolation between vertically-aligned neighbor pixels to provide intermediate pixel values followed by horizontal interpolation between the intermediate pixel values to provide the value of the first pixel. Each subsequent pixel value that has the same neighbor pixels as a previous resampled point is determined by transforming the subsequent pixel to a subsequent resampled point and by a single horizontal interpolation between the intermediate pixel values of the previous resampled point. The value of each subsequent pixel in each row that has different neighbor pixels from the previous resampled point is determined by transforming the subsequent pixel to a subsequent resampled point and by a single vertical interpolation followed by a single horizontal interpolation to provide the value of the subsequent pixel.

18 Claims, 6 Drawing Sheets

INTERPOLATION METHOD AND APPARATUS FOR FAST IMAGE MAGNIFICATION

FIELD OF THE INVENTION

This invention relates to transformation of digital images and, more particularly, to interpolation methods and apparatus which result in fast image magnification.

BACKGROUND OF THE INVENTION

A digital image of an object is formed as an array of rows and columns of pixels, which correspond to pixels on a display screen or other display device. Pixels are typically identified by their x, y coordinates in the pixel array. Each pixel has one or more associated values which represent an incremental area of the object. When the image is a black and white image, the pixel value represents a gray shade of the incremental area. When the image is a color image, red, green and blue values are associated with each pixel. Examples of digital images include, but are not limited to, medical images such as digital x-rays and MRI images, digital film images, digital video images, and satellite images.

Various spatial transformations may be performed on a digital image. These transformations include scaling, rotation and translation of an image or a portion of an image. When an image of an object is magnified, a resampling is required to map the original, or source, image to a magnified, or destination, image. The magnified image is represented by a greater number of pixels than the source image.

A conventional technique for magnifying an image of an object involves a reverse mapping of pixels from the magnified image to resampled points in the source image. In general, the resampled points in the source image do not coincide exactly with single pixel locations. Accordingly, it is necessary to determine a pixel value of the resampled point from one or more pixel values in the neighborhood of the resampled point. The neighbor pixels of the resampled point are determined. In one approach, the value of the resampled point is determined as the value of the nearest neighbor pixel in the source image. In another approach, interpolation between a selected number of neighbor pixels is used to determine the value of the resampled point. Typically, either bilinear or bicubic interpolation is utilized. In bilinear interpolation, the four nearest neighbor pixels of the resampled point are determined. Vertically-aligned intermediate pixel values are determined by interpolation between sets of two horizontally-aligned neighbor pixels. Then, the pixel value of the resampled point is determined by interpolation between the vertically-aligned intermediate pixel values. This procedure is repeated for each pixel in the magnified image. A similar approach is used for bicubic interpolation. The sixteen nearest neighbor pixels of the resampled point are determined. Vertically-aligned intermediate pixel values are determined by interpolating between sets of four horizontally-aligned neighbor pixels. Then, the pixel value of the resampled point is determined by interpolation between the four vertically-aligned intermediate pixel values. The process is repeated for each pixel in the magnified image.

A typical magnified image may have 400×400 to 1600× 1200 pixels. The interpolation operations, which require multiple computations for each pixel in the image, can be time consuming, even when performed by a high speed digital computer. The time required for image magnification can be annoying or unacceptable to a user.

SUMMARY OF THE INVENTION

According to the present invention, methods and apparatus for generating pixel values in a magnified destination image of an object in a destination image space are provided. The pixel values in the destination image are generated from a source image of the object in a source image space. The destination image and the source image each comprise a two-dimensional array of pixels. Each of the pixels has a value representative of the object. Pixel locations of the destination image in the destination image space are determined from a magnification factor and the size and location of the source image. A first pixel in the destination image is transformed to a first resampled point in the source image space. Neighbor pixels of the first resampled point in the source image space are determined. Intermediate pixel values are determined by interpolation between vertically-aligned neighbor pixels in the source image space. A value of the first resampled point in the destination image is determined by a single horizontal interpolation between the intermediate pixel values.

The above process is used to determine the value of the first pixel in a pixel row of the destination image. Then, the values of the remaining pixels in the current pixel row of the destination image are determined sequentially, each pixel value being determined as follows. A current pixel in the destination image is transformed to a current resampled point in the source image space. The current pixel is adjacent to the previous pixel in the current row of the destination image. Next, a determination is made if the current resampled point in the source image space has the same neighbor pixels as the previous point. When the current resampled point has the same neighbor pixels as the previous point, a value of the current resampled point in the destination image may be determined by a single horizontal interpolation between the intermediate pixels calculated for the previous point. When the current resampled point does not have the same neighbor pixels as the previous point, a single current intermediate pixel value may be determined by interpolation between a current set of vertically-aligned neighbor pixels of the current resampled point, and the value of the current resampled point in the destination image may be determined by a single horizontal interpolation between the current intermediate pixel value and at least one of the intermediate pixel values corresponding to the previous point. Thus, current pixel values may be determined, for each pixel except the first pixel in each row, by one interpolation when the current resampled point has the same neighbor pixels as the previous point and by two interpolations when the current resampled point does not have the same neighbor pixels as the previous point. The invention may be utilized with bilinear interpolation and with bicubic interpolation.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
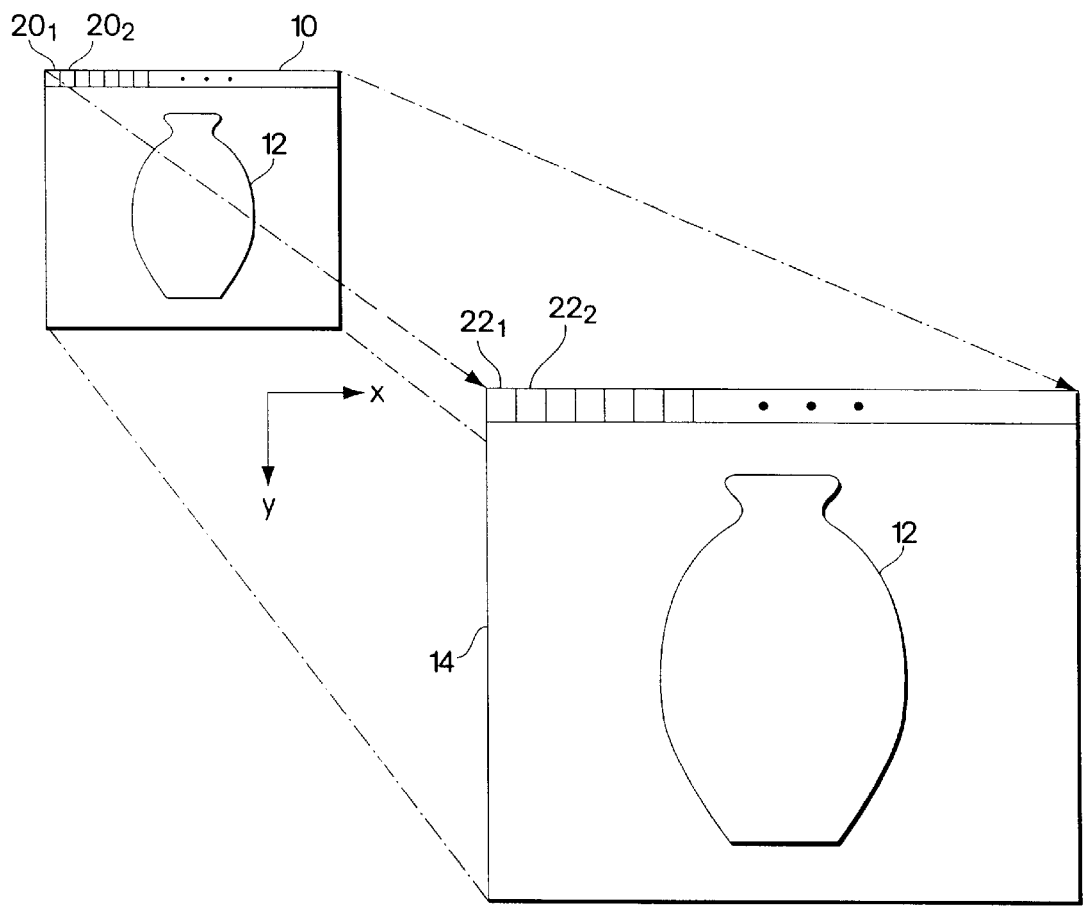
FIG. 1 is a pictorial illustration of image magnification in accordance with the present invention.

The present invention relates to magnification of a digital image of an object or multiple objects. As shown in FIG. 1, a source image 10 of an object 12 is magnified to provide a destination image 14 of the object 12. The source image 10 is formed in a source image space, and the destination image 14 is formed in a destination image space. The source image 10 and the destination image 14 may each be part of a larger image. The source image 10 is made up of an array of pixels $20_1$, $20_2$, etc. arranged in rows and columns. The destination image 14 is likewise made up of an array of pixels $22_1$, $22_2$, etc. arranged in rows and columns. The pixel locations are identified by x, y coordinates in each pixel array. Each of the pixels in the source image 10 has one or more associated pixel values, which represent a gray shade in a black and white image or RGB color values in a color image. Pixel values in the destination image 14 are determined from the size and location of the source image and the specified magnification factor. For a given display format, the pixel dimensions in the source image 10 and in the destination image 14 are the same. Accordingly, the number of pixels in the magnified destination image is greater than the number of pixels in the source image 10. The present invention provides an efficient method and apparatus for determining the pixel values in the magnified destination image 14.

Because the destination image 14 has a greater number of pixels than the source image 10, it is customary to use a reverse, or backward, transformation technique. According to the backward transformation technique, each pixel $22_1$, $22_2$, etc. in the destination image 14 is transformed into the source image 10, and pixel values are determined from the source image 10. The steps involved in the transformation are as follows. The pixel locations in the destination image 14 are determined from the size and location of the source image 10 and the specified magnification factor. A pixel in the magnified destination image 14 is reverse transformed from the destination image space to the source image space in accordance with the following operation:

$$\begin{bmatrix} a & d & g \\ b & e & h \\ 0 & 0 & 1 \end{bmatrix} \times \begin{bmatrix} x \\ y \\ 1 \end{bmatrix} = \begin{bmatrix} x' \\ y' \\ 1 \end{bmatrix} \quad (1)$$

where x and y represent the coordinates of the destination pixel in the destination image space, and x' and y' represent the coordinates of a resampled point in the source image space. The matrix including coefficients a, b, d, e, g and h is a two-dimensional affine transformation matrix wherein coefficients a and e represent scaling, coefficients a, b, d and e represent rotation, and coefficients g and h represent translation. The two-dimensional affine transformation matrix is known to those skilled in the art. The values of a, b, d, e, g and h are derived from the specified scale, rotation and translation. Equation (1) is solved for x' and y' as follows:

$$x' = (a*x)+(d*y)+g \quad (2)$$

$$y' = (b*x)+(e*y)+h \quad (3)$$

In general, the coordinates of the resampled point x', y' are fractional values and do not coincide with pixel locations in the source image space. The next step is to determine neighbor pixels in the source image which are closest to the resampled point determined in equations (2) and (3). A first neighbor is determined as follows:

$$i = \text{floor}(x') \quad (4)$$

$$j = \text{floor}(y') \quad (5)$$

where i and j represent integer values of a neighbor pixel in the source image and "floor" is a C library function which converts a floating point value to a scalar value. Values of a group of neighbor pixels surrounding the resampled point may be utilized in an interpolation operation to determine a pixel value of the resampled point in the destination image. Typically, bilinear interpolation or bicubic interpolation is utilized. Four neighbor pixels in a 2×2 array surrounding the resampled point are utilized in bilinear interpolation. Sixteen neighbor pixels in a 4×4 array are utilized in bicubic interpolation. Then, the values of dx and dy, which specify the location of the resampled point relative to a base neighbor pixel, are determined as follows:

$$dx = x' - i \quad (6)$$

$$dy = y' - j \quad (7)$$

where dx represents the x axis component of the distance between the resampled point and the nearest neighbor pixel having a smaller x coordinate than the resampled point, and dy represents the y axis component of the distance between the resampled point and the same nearest neighbor pixel. Methods and apparatus for transforming pixels in the destination image to resampled points in the source image are disclosed in application Ser. No. 08/656,130 filed May 31, 1996 and entitled "An Apparatus and Method for Performing Fast and Precise Spatial Transformations of Images", which is hereby incorporated by reference.

Figure 2:
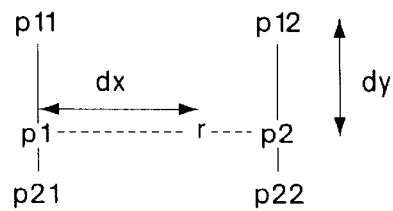
FIG. 2 is a diagram that illustrates the order of operations for bilinear interpolation in accordance with the invention.

FIG. 2 schematically shows a portion of a source image including a resampled point r and neighbor pixels p11, p12, p21 and p22 used for bilinear interpolation, referred to as a "bilinear neighborhood". Also shown in FIG. 2 are dx, the x axis component of distance between resampled point r and the neighbor pixel with a smaller x coordinate, and dy, the y axis component of distance between resampled point r and the neighbor pixel with a smaller y coordinate. The bilinear interpolation to determine the pixel value of resampled point r in the destination image is performed in two parts. First, a vertical interpolation is performed between vertically-aligned pixels p11 and p21 to determine an intermediate pixel value p1 at a distance dy from pixel p11. Also, a vertical interpolation is performed between vertically-aligned pixels p12 and p22 to determine an intermediate pixel value p2 at a distance dy from pixel p12. It will be noted that intermediate pixel values p1 and p2 have the same y value and therefore are horizontally aligned. Next, a horizontal interpolation is performed between the horizontally-aligned intermediate pixel values p1 and p2 to determine the pixel value of resampled point r. The values of p1, p2 and r are determined as follows:

$$p1 = ((p21-p11)*dy)+p11 \quad (8)$$

$$p2 = ((p22-p12)*dy)+p12 \quad (9)$$

$$r = ((p2-p1)*dx)+p1 \quad (10)$$

where p11, p21, p12 and p22 represent the pixel values of the corresponding neighbor pixels in the source image. The value of r is a pixel value in the destination image. Pixel values of the remaining pixels in the same row of the destination image are determined more simply and quickly, as described below.

Figure 3:
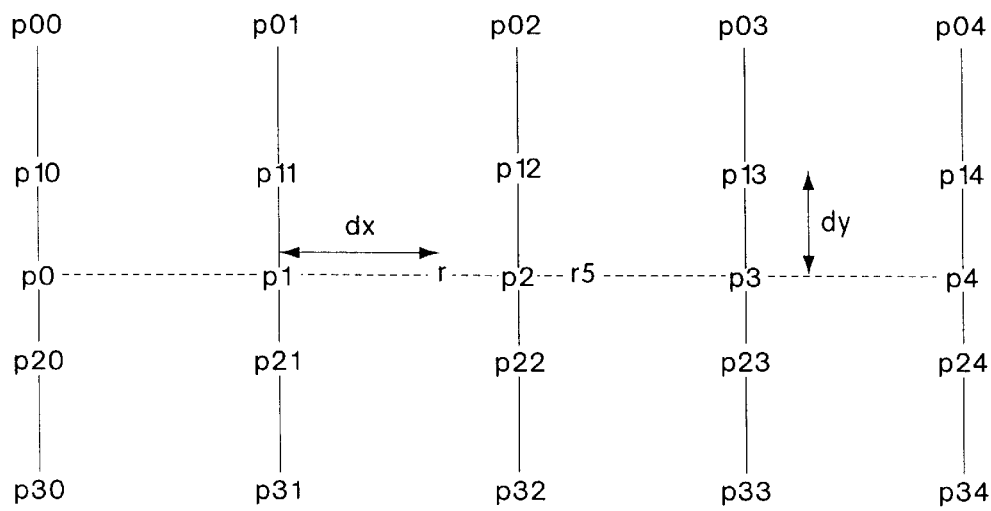
FIG. 3 is a diagram that illustrates the order of operations for bicubic interpolation in accordance with the invention.

A schematic representation of a neighborhood used for bicubic interpolation, or "bicubic neighborhood", is shown in FIG. 3. A group of sixteen neighbor pixels p00, p01, . . . p33 is determined with respect to resampled point r. The sixteen neighbor pixels have a 4×4 configuration, and resampled point r is located within a region defined by pixels p11, p12, p21 and p22. The value of dx is determined with respect to the nearest neighbor pixel having a smaller x coordinate than the resampled point r, and the value of dy is determined with respect to the nearest neighbor pixel having a smaller y coordinate than the resampled point r. The bicubic interpolation is performed as follows. First a vertical interpolation is performed on each of the vertically-aligned columns of pixels in the bicubic neighborhood to determine intermediate pixel values p0, p1, p2 and p3, each of which have the same y coordinate as resampled point r. For example, intermediate pixel value p0 is determined by interpolation between vertically-aligned pixels p00, p10, p20 and p30. Intermediate pixel values p1, p2 and p3 are determined in the same manner by vertical interpolation. Then, a horizontal interpolation is performed on horizontally-aligned intermediate pixel values p0, p1, p2 and p3 to determine the pixel value of resampled point r, which represents a pixel value in the destination image. The bicubic interpolation is performed in accordance with the following equations:

$$cx0 = (a*dx^3) - (2a*dx^2) + (a*dx) \quad (11)$$

$$cx1 = ((a+2)dx^3) - ((a+3)*dx^2) + 1 \quad (12)$$

$$cx2 = -((a+2)*dx^3) + ((2a+3)*dx^2) - (a*dx) \quad (13)$$

$$cx3 = (a*dx^2) - (a*dx^3) \quad (14)$$

$$cy0 = (a*dy^3) - (2a*dy^2) + (a*dy) \quad (15)$$

$$cy1 = ((a+2)dy^3) - ((a+3)*dy^2) + 1 \quad (16)$$

$$cy2 = -((a+2)*dy^3) + ((2a+3)*dy^2) - (a*dy) \quad (17)$$

$$cy3 = (a*dy^2) - (a*dy^3) \quad (18)$$

$$p0 = (cy0*p00) + (cy1*p10) + (cy2*p20) + (cy3*p30)) \quad (19)$$

$$p1 = (cy0*p01) + (cy1*p11) + (cy2*p21) + (cy3*p31)) \quad (20)$$

$$p2 = (cy0*p02) + (cy1*p12) + (cy2*p22) + (cy3*p32)) \quad (21)$$

$$p3 = (cy0*p03) + (cy1*p13) + (cy2*p23) + (cy3*p33)) \quad (22)$$

$$r = (cx0*p0) + (cx1*p1) + (cx2*p2) + (cx3*p3)) \quad (23)$$

where a is the matrix coefficient shown in equation (1), and cx0, cx1, cx2, cx3, cy0, cy1, cy2 and cy3 are cubic convolution coefficients. The variables p00, p01, . . . p33 are the pixel values of the respective pixels in the bicubic neighborhood. Pixel values of the remaining pixels in the same row of the destination image are determined more simply and quickly, as described below.

Figure 4:
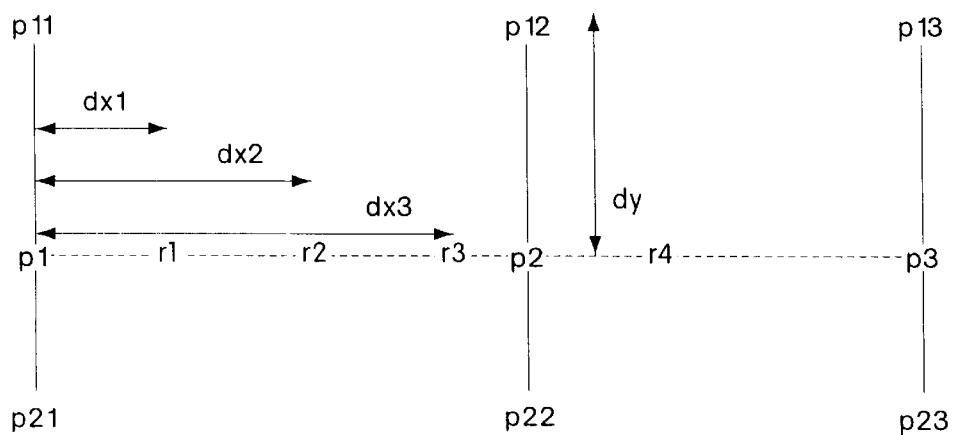
FIG. 4 is a diagram that illustrates a process for determining successive pixel values by bilinear interpolation in accordance with the invention.

Orthogonal magnifications (magnifications without rotation) usually produce more than one and often produce multiple resampled points within the same neighborhood, depending on the magnification factor. FIG. 4 is a schematic representation of a bilinear neighborhood wherein successive resampled points r1, r2 and r3 fall within a neighborhood defined by pixels p11, p12, p21 and p22 in the source image. The destination image is preferably generated by determining successive pixel values in a pixel row and then proceeding to the next row, until the process is complete. Resampled points r1, r2 and r3 have the same y axis value and therefore the same dy, because they correspond to consecutive pixels in a row of the destination image. Accordingly, the calculated intermediate pixel values p1 and p2 can be reused for each resampled point that falls within the neighborhood defined by pixels p11, p12, p21 and p22. Assume that resampled point r1 corresponds to the first pixel in a row of the destination image. The intermediate pixel values p1 and p2 are calculated as described above, by vertical interpolation between pixel values p11 and p21 and between pixel values p12 and p22, respectively. Then, the value of resampled point r1 is determined by horizontal interpolation between intermediate pixel values p1 and p2 using dx1, which corresponds to resampled point r1. For resampled points r2 and r3, the same intermediate pixel values p1 and p2 are used. The value of resampled point r2 is determined by horizontal interpolation between intermediate pixel values p1 and p2 using dx2. The value of resampled point r3 is determined by horizontal interpolation between intermediate pixel values p1 and p2 using dx3. Thus, the intermediate values p1 and p2 determined by vertical interpolation between vertically-aligned neighbor pixels are reused for each resampled point that falls within the neighborhood defined by pixels p11, p12, p21 and p22. The equations for determining resampled points r1, r2 and r3 are shown below:

$$p1 = ((p21-p11)*dy) + p11 \quad (24)$$

$$p2 = ((p22-p12)*dy) + p12 \quad (25)$$

$$r1 = ((p2-p1)*dx1) + p1 \quad (26)$$

$$r2 = ((p2-p1)*dx2) + p1 \quad (27)$$

$$r3 = ((p2-p1)*dx3) + p1 \quad (28)$$

By reusing the intermediate pixels values p1 and p2, the required computation is substantially reduced. In particular, only one horizontal interpolation is required for each resampled point, except the first, in a given neighborhood.

In addition to reduced computation within a neighborhood, vertical interpolations are reduced as the transformation process moves to adjacent neighborhoods. Referring again to FIG. 4, resampled point r4 has neighbor pixels p12, p13, p22 and p23. The neighborhood of resampled point r4 is adjacent to and in the same row as the neighborhood of resampled points r1, r2 and r3. The intermediate pixel value p2 is known from the calculations performed in the adjacent neighborhood. Intermediate pixel value p3 is determined by vertical interpolation between vertically-aligned neighbor pixels p13 and p23. The value of resampled point r4 is determined by horizontal interpolation between intermediate pixel values p2 and p3. Thus, in neighborhoods subsequent to the first neighborhood in a pixel row, the first resampled point is determined by one vertical interpolation and one horizontal interpolation. Subsequent resampled points within the same neighborhood are determined by one horizontal interpolation as described above. Since it is necessary to perform two vertical interpolations and one horizontal interpolation only for the first resampled point in each pixel row, the required computations are reduced substantially in comparison with the prior art technique, which required three interpolations for each resampled point.

A similar approach is utilized in bicubic interpolation. The full bicubic interpolation is required only for the first resampled point in each pixel row. For subsequent resampled points within the same neighborhood (such as the neighborhood defined by neighbor pixels p11, p12, p21 and p22 in FIG. 3), the value of the resampled point is determined by one horizontal interpolation between intermediate pixel values p0, p1, p2 and p3. The vertical interpolations to determine the intermediate pixel values p0, p1, p2 and p3 are reused to determine the pixel values of subsequent resampled points within the same neighborhood. When the resampled point falls within the adjacent neighborhood, only one vertical interpolation and one horizontal interpolation are required. For example, assume that a new resampled point r5 falls in a neighborhood defined by nearest neighbor pixels p12, p13, p22 and p23. The sixteen neighbor pixels of resampled point r5 include twelve pixels from the previous neighborhood (excluding pixels p00, p10, p20 and p30) and new pixels p04, p14, p24 and p34. Thus, the bicubic neighborhood of resampled point r5 is adjacent to and in the same row as the neighborhood of resampled point r. The value of resampled point r5 is determined as follows. Intermediate pixel value p4 is determined by vertical interpolation between vertically-aligned pixel values p04, p14, p24 and p34. The value of resampled point r5 is determined by horizontal interpolation between intermediate pixel values p1, p2, p3 and p4. The intermediate pixel values p1, p2 and p3 are reused from previous interpolations. Thus, resampled points within the same neighborhood require only one horizontal interpolation. The first resampled point within an adjacent neighborhood requires one vertical interpolation and one horizontal interpolation. By contrast, prior art techniques required five interpolations for each pixel in the destination image. Average performance improvements of 80 percent for bilinear interpolation and 400 percent for bicubic interpolation have been measured.

Figure 5:
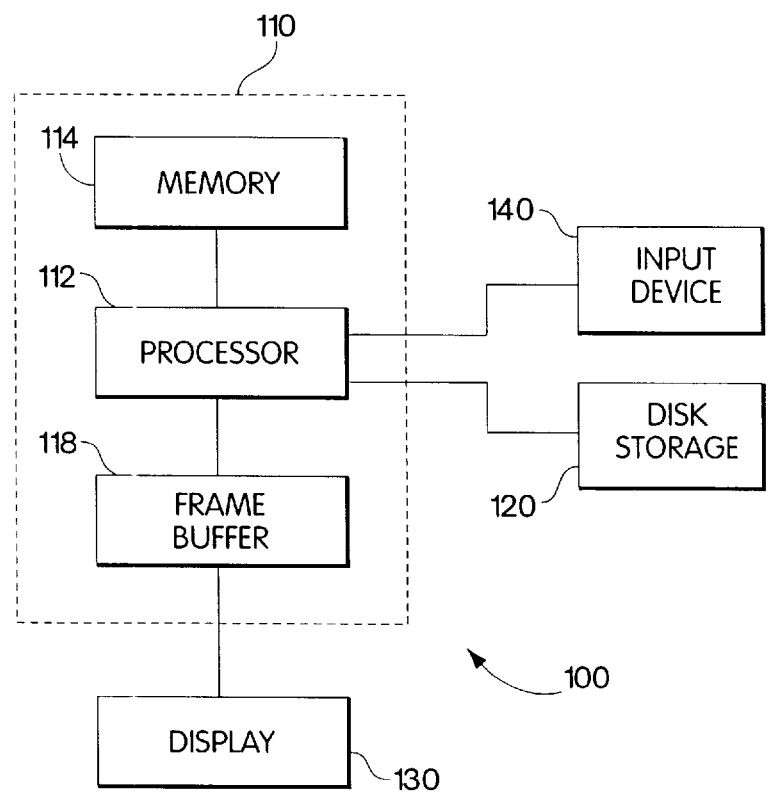
FIG. 5 is a block diagram of an example of a hardware configuration for implementing the present invention.

A block diagram of an example of a computer system 100 suitable for magnifying digital images in accordance with the present invention is shown in FIG. 5. The computer system 100 includes a central processing unit (CPU) 110, a disk storage unit 120, a display 130 for displaying source images of objects and magnified destination images of objects, and an input device 140. The frame buffer 118 may, for example, be a model HCRX-24 manufactured by Hewlett-Packard Company. The disk storage unit 120 is typically implemented using one or more hard disk drives. The input device 140 may be implemented using a standard keyboard and a pointing device, such as a mouse or trackball.

The CPU 110 includes a processor 112, a memory 114 and a frame buffer 118 for storing an image to be displayed on the display 130. The processor 112 provides the primary processing capabilities of the computer system 100 and may, for example, be implemented using a model C110 manufactured by Hewlett-Packard Company. The memory 114 is used for storage of program instructions and for storage of results of calculations performed by the processor 112. In a preferred embodiment, the memory includes 64 megabits of RAM. The frame buffer 118 is a high speed buffer memory device capable of storing one frame of data for the display 130. The software routines for performing image magnification in accordance with the invention may be implemented using the "C" programming language and may reside in memory 114 and/or disk storage unit 120. The computer program for performing image magnification in accordance with the invention may be stored on a computer-readable medium such as, for example, magnetic disk, compact disk or magnetic tape and may be loaded into the computer system 100 using an appropriate peripheral device, as known in the art. It will be understood that the hardware components identified above are given by way of example only and that the invention may be implemented in a variety of different computer systems.

Figure 6A:
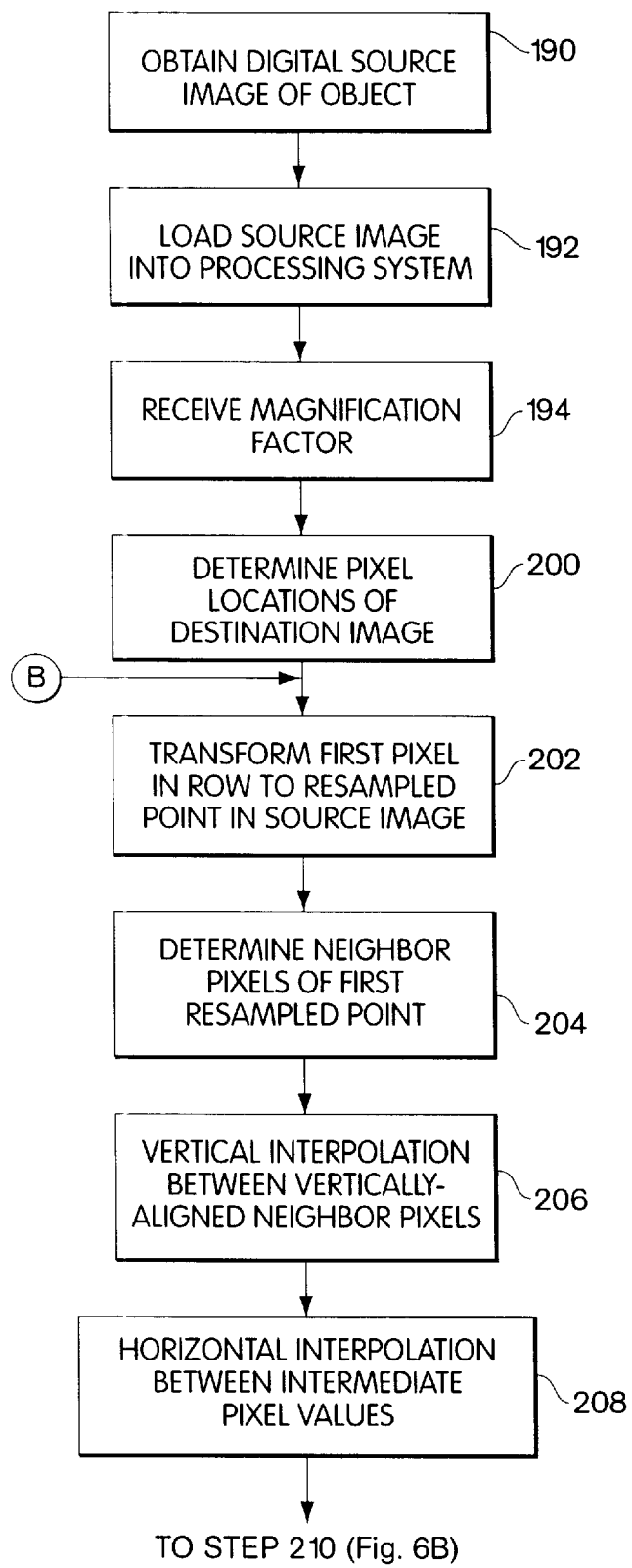
FIGS. 6A–6C show a flow chart of a process for generating a magnified image of an object in accordance with the invention.
Figure 6B:
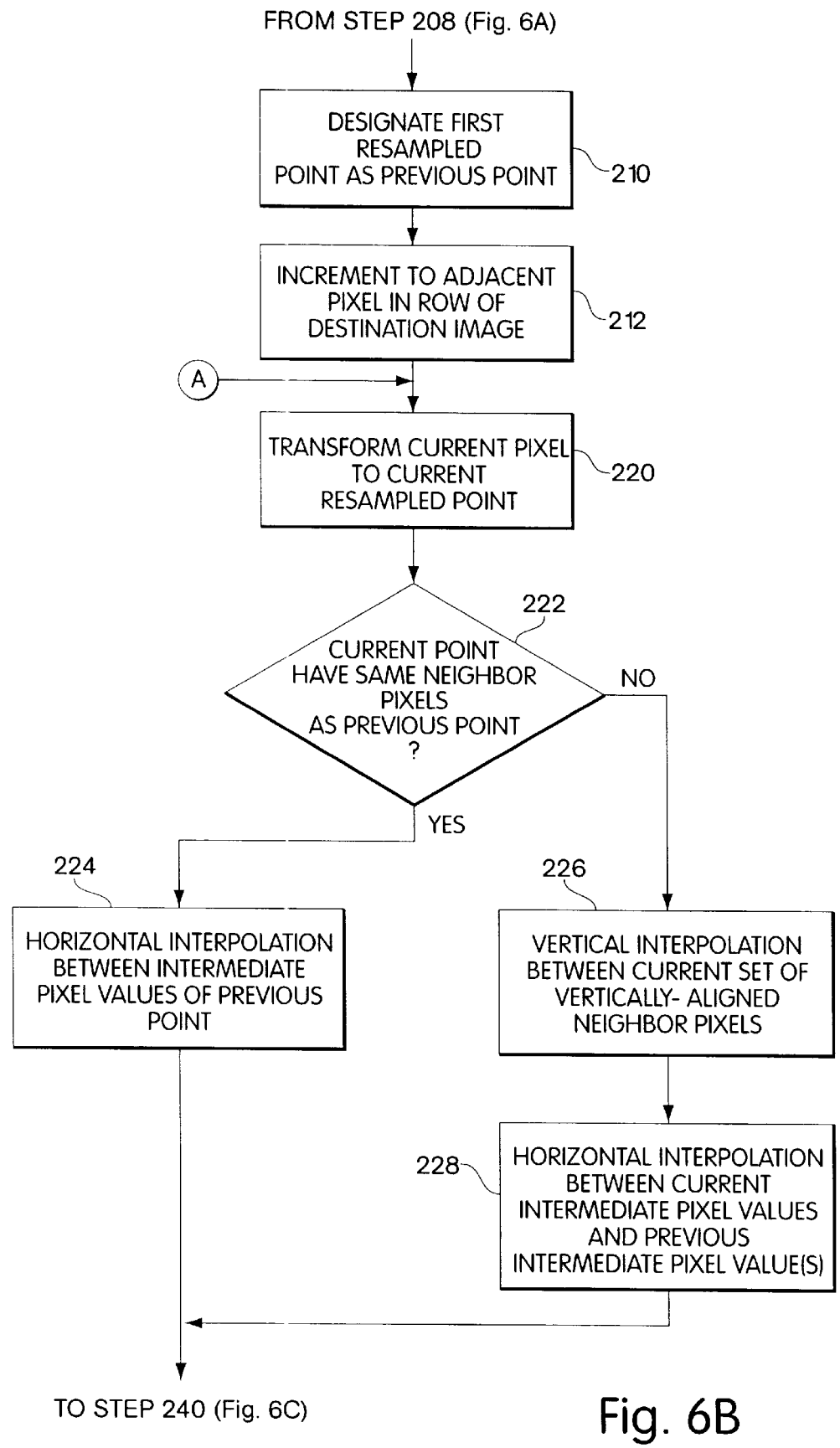
Figure 6C:
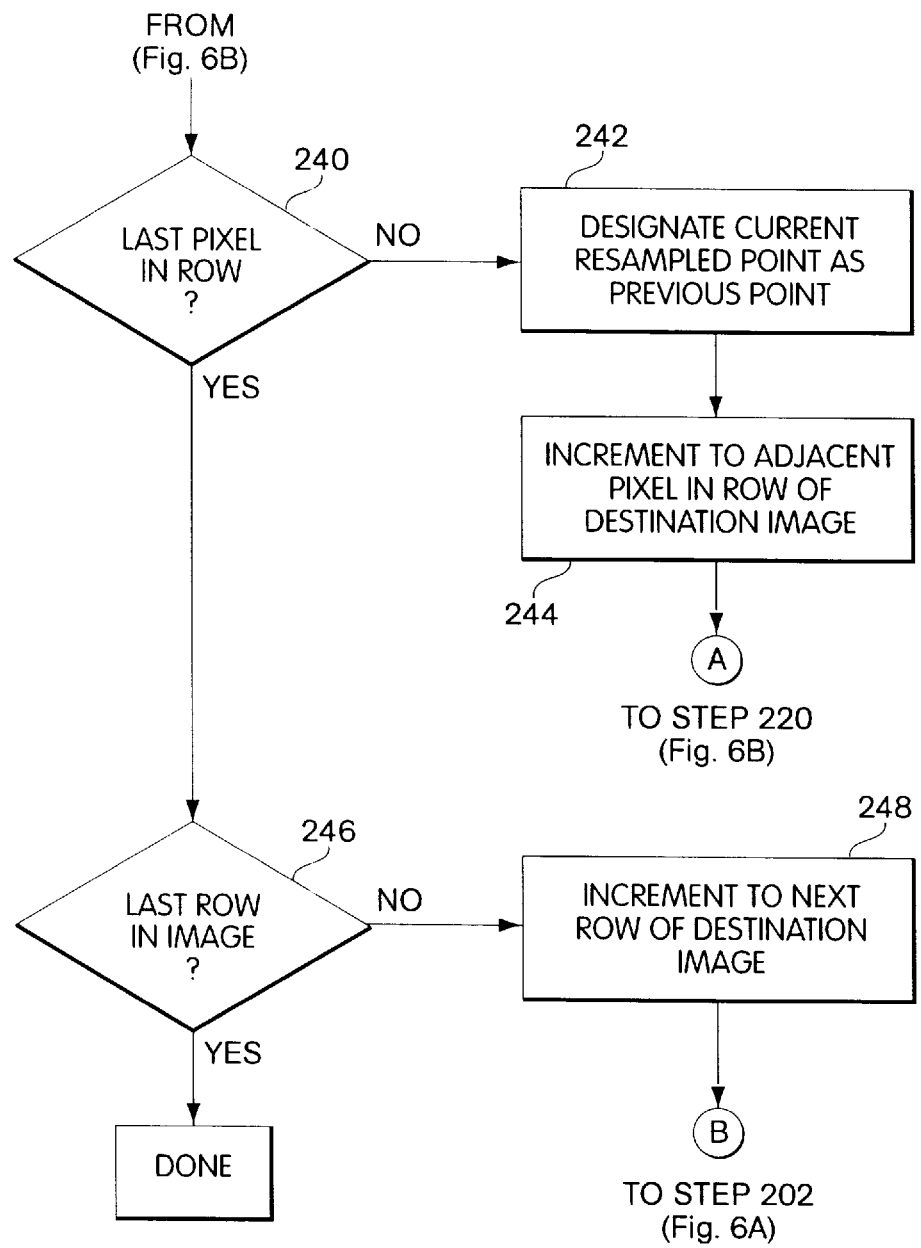

The process for generating a magnified destination image from a source image in accordance with the invention is illustrated in the flow chart of FIGS. 6A–6C. A digital source image of an object is obtained in step 190. The digital source image may be a digital x-ray, an MRI image, a digital film image, a digital video image, a satellite image or any other image of an object in digital format. In the case of a black and white image, each pixel is represented by a single digital word of a predetermined number of bits such as, for example, 8 bits. In the case of a color image, each pixel is represented by 3 digital words corresponding to red, green and blue values, and the operations described below are performed for each color value. The source image is loaded into a spatial transformation system as shown in FIG. 5 and described above in step 192. The transformation system receives a magnification factor in step 194. The magnification may be performed on all or part of the source image. Pixel locations in the magnified destination image are determined in step 200 based on the source image location and size, and the required magnification factor. A first pixel in a row of the destination image is transformed to a resampled point in the source image using equations (2) and (3) in step 202, and neighbor pixels of the resampled point are determined in step 204. As described above, four neighbor pixels are utilized for bilinear interpolation and sixteen neighbor pixels are utilized for bicubic interpolation. Vertical interpolations between vertically-aligned neighbor pixels are performed in step 206 to determine intermediate pixel values. Horizontal interpolations between the intermediate pixel values are performed in step 208 to determine the value of the first pixel in the destination image. The interpolations performed in steps 206 and 208 may be bilinear interpolations or bicubic interpolations as described above. After the first pixel value in a row is determined, the first resampled point is designated as a previous point in step 210, and the process increments to the adjacent pixel in the same row of the destination image in step 212.

In step 220, the adjacent pixel in the same row of the magnified destination image (the current pixel) is transformed to a new resampled point in the source image using equations (2) and (3) above. In step 222, a determination is made whether the current resampled point has the same neighbor pixels as the previous resampled point. This can be determined by examining the value of i in equation (4), which represents the nearest pixel in the source image having a smaller x coordinate than the current resampled point. If the value of i for the current resampled point is the same as the value i for the previous resampled point, the two resampled points have the same neighbor pixels. If the value of i for the current resampled point is greater than the value of i for the previous resampled point, the current resampled point is in an adjacent neighborhood. When the current resampled point has the same neighbor pixels as the previous resampled point, horizontal interpolation is performed between the intermediate pixel values of the previous point in step 224 to provide the value of the current pixel in the destination image. When the current resampled point does not have the same neighbor pixels as the previous point and is therefore in the adjacent neighborhood, vertical interpolation is performed between a current set of vertically-aligned neighbor pixel values to provide a current intermediate pixel value in step 226. Then, horizontal interpolation is performed between the current intermediate pixel value and one or more previous intermediate pixel values in step 228 to provide a value of the current pixel in the destination image. When bilinear interpolation is utilized, the value of the current pixel is determined by interpolation between the current intermediate pixel value and one previous intermediate pixel value, as described above in connection with FIG. 4. When bicubic interpolation is utilized, the value of the current pixel is determined by interpolation between the current intermediate pixel value and three of the four previous intermediate pixel values, as described above in connection with FIG. 3.

In step 240, a determination is made whether the current pixel is the last pixel in a row of the destination image. When the current pixel is not the last pixel in a row, the current resampled point is designated as the previous point in step 242, and the process increments to the adjacent pixel in the same row in step 244. Then, the process returns to step 220, and the current pixel in the row is processed to determine its value in the destination image. When the current pixel is the last pixel in a row, a determination is made in step 246 whether the last row in the destination image has been processed. When the current row is not the last row in the image, the process increments to the next row of the destination image in step 248. The, the process returns to step 202, and a new row is processed in the manner described above. Following processing of the last row in image the generation of the destination image is complete.

The interpolation process of the invention has been described as a sequence including vertical interpolation to determine intermediate pixel values followed by horizontal interpolation to determine final pixel values. This sequence applies to the typical situation where pixel values for successive pixels in a row are stored in successive memory locations, and pixels are determined by stepping horizontally across a row in succession. This sequence permits the reuse of the vertical interpolation results in determining successive pixel values during horizontal stepping. More generally, the invention involves initial interpolation perpendicular to the direction of stepping followed by interpolation parallel to the direction of stepping between points, so that the results of the perpendicular interpolations may be reused.

While there have been shown and described what are at present considered the preferred embodiments of the present invention, it will be obvious to those skilled in the art that various changes and modifications may be made therein without departing from the scope of the invention as defined by the appended claims.

We claim:

1. A method for generating pixel values in a magnified destination image of an object in a destination image space from a source image of the object in a source image space, said destination image and said source image each comprising a two-dimensional array of pixels, each of said pixels in said source image having a value representative of the object, said method comprising the steps of:

transforming each pixel in the destination image to a corresponding resampled point in said source image space;

determining a value of a first pixel in each row of the destination image by vertical interpolation between vertically-aligned neighbor pixels of the corresponding resampled point to provide intermediate pixel values, followed by horizontal interpolation between said intermediate pixel values to provide the value of said first pixel; and determining a value of each subsequent pixel in each row of the destination image that has the same neighbor pixels as a previous resampled point by a single horizontal interpolation between the intermediate pixel values of the previous resampled point.

2. A method for generating pixel values as defined in claim 1 further comprising the step of determining the value of each subsequent pixel in each row of the destination image that does not have the same neighbor pixels as the previous resampled point by a single vertical interpolation between a subsequent set of vertically-aligned neighbor pixels to provide a subsequent intermediate pixel value, followed by a single horizontal interpolation between the subsequent intermediate pixel value and one or more of the previous intermediate pixel values to provide the value of said subsequent pixel.

3. A method as defined in claim 1 wherein said interpolation steps comprise bilinear interpolations.

4. A method as defined in claim 1 wherein said interpolation steps comprise bicubic interpolations.

5. A method for generating pixel values in a magnified destination image of an object in a destination image space from a source image of the object in a source image space, said destination image and said source image each comprising a two-dimensional array of pixels, each of said pixels in said source image having a value representative of the object, said method comprising the steps of:

(a) determining a value of a first pixel in each row of said destination image by transforming the first pixel to a first resampled point in the source image space and by vertical interpolation between vertically-aligned neighbor pixels of the first resampled point to provide intermediate pixel values, followed by horizontal interpolation between said intermediate pixel values to provide the value of said first pixel in the destination image;

(b) determining a value of each subsequent pixel in each row of the destination image that has the same neighbor pixels as a previous resampled point by transforming the subsequent pixel to a subsequent resampled point in the source image space and by a single horizontal interpolation between the intermediate pixel values of the previous resampled point; and (c) determining the value of each subsequent pixel in each row of the destination image that has different neighbor pixels from a previous resampled point by transforming the subsequent pixel to a subsequent resampled point in the source image space and by a single vertical interpolation between a set of vertically-aligned neighbor pixels of the subsequent resampled point to provide a subsequent intermediate pixel value, followed by a single horizontal interpolation between the subsequent intermediate pixel value and one or more previous intermediate pixel values to provide the value of the subsequent resampled point in the destination image.

6. A method as defined in claim 5 wherein said interpolation steps comprise bilinear interpolations.

7. A method as defined in claim 5 wherein said interpolation steps comprise bicubic interpolations.

8. A method for generating pixel values in a magnified destination image of an object in a destination image space from a source image of the object in a source image space, said destination image and said source image each comprising a two-dimensional array of pixels, each of said pixels in said source image having a value representative of the object, said method comprising the steps of:

(a) determining pixel locations of the destination image in said destination image space from a location and size of said source image and a magnification factor;

(b) transforming a first pixel in a row of the destination image to a first resampled point in said source image space;

(c) determining neighbor pixels of the first resampled point in said source image space;

(d) interpolating between vertically-aligned neighbor pixels in said source image space to provide horizontally-aligned intermediate pixel values;

(e) interpolating between said horizontally-aligned intermediate pixel values to provide a first value of said first pixel in the destination image;

(f) designating the first pixel as a previous pixel and the first resampled point as a previous point, and incrementing to a current pixel in said row adjacent to said previous pixel;

(g) transforming the current pixel in the destination image to a current resampled point in said source image space;

(h) determining if the current resampled point in said source image space has the same neighbor pixels as said previous point;

(i) when the current resampled point has the same neighbor pixels as said previous point, interpolating between the horizontally-aligned intermediate pixel values of said previous point to provide a current value of said current resampled point in the destination image; and (j) when the current resampled point does not have the same neighbor pixels as said previous point, interpolating between one set of vertically-aligned neighbor pixels of said current resampled point to provide a current intermediate pixel value and interpolating between the current intermediate pixel value and at least one of said intermediate pixel values to provide the current value of said current resampled point in the destination image.

9. A method as defined in claim 8 wherein step c) comprises determining four neighbor pixels and wherein steps d) and e) comprise bilinear interpolations.

10. A method as defined in claim 8 wherein step c) comprises determining sixteen neighbor pixels and wherein steps d) and e) comprise bicubic interpolations.

11. A method as defined in claim 8 further comprising:

(k) repeating steps (g)–(j) for each remaining pixel in the row of the destination image.

12. A method as defined in claim 11 further comprising:

(l) repeating steps (b)–(k) for each remaining row of the destination image.

13. Apparatus for generating pixel values in a magnified destination image of an object in a destination image space from a source image of the object in a source image space, said destination image and said source image each comprising a two-dimensional array of pixels, each of said pixels in said source image having a value representative of the object, comprising:

a disk storage unit for storing the values of the pixels in the source image;

a digital computer for processing the values of the source image in said disk storage unit, said digital computer comprising:

means for determining pixel locations of the destination image in said destination image space from a location and size of said source image and a magnification factor;

means for transforming each pixel in the destination image to a corresponding resampled point in said source image space;

means for determining a value of a first pixel in each row of the destination image by vertical interpolation between vertically-aligned neighbor pixels of the corresponding resampled point to provide intermediate pixel values, followed by horizontal interpolation between said intermediate pixel values to provide the value of said first pixel; and means for determining a value of each subsequent pixel in each row of the destination image that has the same neighbor pixels as the previous resampled point by a single horizontal interpolation between the intermediate pixel values of the previous resampled point.

14. Apparatus as defined in claim 13 further comprising means for determining the value of each subsequent pixel in each row of the destination image that does not have the same neighbor pixels as the previous resampled point by a single vertical interpolation between a subsequent set of vertically-aligned neighbor pixels to provide a subsequent intermediate pixel value, followed by a single horizontal interpolation between the subsequent intermediate pixel value and one or more of the previous intermediate pixel values to provide the value of said subsequent pixel.

15. A computer-readable medium encoded with a computer program for generating pixel values in a magnified destination image of an object in a destination image space from a source image of the object in a source image space, said destination image and said source image each comprising a two-dimensional array of pixels, each of said pixels in said source image having a value representative of the object, said computer program comprising computer instructions for:

(a) determining a value of a first pixel in each row of said destination image by transforming the first pixel to a first resampled point in the source image space and by vertical interpolation between vertically aligned neighbor pixels of the first resampled point to provide intermediate pixel values, followed by horizontal interpolation between said intermediate pixel values to provide the value of said first pixel in the destination image; and (b) determining a value of each subsequent pixel in each row of the destination image that has the same neighbor pixels as the previous resampled point by transforming the subsequent pixel to a subsequent resampled point in the source image and by a single horizontal interpolation between the intermediate pixel values of the previous resampled point.

16. A computer-readable medium as defined in claim 15 wherein said computer program further comprises computer instructions for determining the value of each subsequent pixel in each row of the destination image that has different neighbor pixels from a previous resampled point by transforming the subsequent pixel to a subsequent resampled point in the source image space and by a single vertical interpolation between a set of vertically-aligned neighbor pixels of the subsequent resampled point to provide a subsequent intermediate pixel value, followed by a single horizontal interpolation between the subsequent intermediate pixel value and one or more previous intermediate pixel values to provide the value of the subsequent resampled point in the destination image.

17. A computer-readable medium as defined in claim 15 comprising a magnetic disk.

18. A method for generating pixel values in a magnified destination image of an object in a destination image space from a source image of the object in a source image space, said destination image and said source image each comprising a two-dimensional array of pixels, each of said pixels in said source image having a value representative of the object, said method comprising the steps of:

transforming each pixel in the destination image to a corresponding resampled point in said source image space by processing the pixels in said destination image in a first direction relative to said array;

determining a value of a first pixel in each row of the destination image by interpolation between neighbor pixels of the corresponding resampled point, which are aligned perpendicular to said first direction, to provide intermediate pixel values, followed by interpolation between said intermediate pixel values, which are aligned parallel to said first direction, to provide the value of said first pixel; and determining a value of each subsequent pixel in each row of the destination image that has the same neighbor pixels as a previous resampled point by a single interpolation between the intermediate pixel values of the previous resampled point, which are aligned parallel to said first direction.

\* \* \* \* \*